United States Patent
Matsuda

(10) Patent No.: US 8,054,365 B2
(45) Date of Patent: Nov. 8, 2011

(54) SOLID-STATE IMAGE PICKUP DEVICE HAVING A SIGNAL SEPARATION PART FOR SEPARATING AND PROVIDING VERTICAL AND HORIZONTAL SIGNALS AND DRIVE METHOD THEREOF

(75) Inventor: Yuji Matsuda, Niigata (JP)

(73) Assignee: Panasonic Corporation, Osaka (JP)

( * ) Notice: Subject to any disclaimer, the term of this patent is extended or adjusted under 35 U.S.C. 154(b) by 442 days.

(21) Appl. No.: 12/269,408

(22) Filed: Nov. 12, 2008

(65) Prior Publication Data

US 2009/0135285 A1 May 28, 2009

(30) Foreign Application Priority Data

Nov. 28, 2007 (JP) ................... 2007-307255

(51) Int. Cl.
*H04N 3/14* (2006.01)
*H04N 5/335* (2006.01)
*G06F 1/00* (2006.01)

(52) U.S. Cl. ....................... 348/312; 713/501

(58) Field of Classification Search .................. 348/311, 348/312, 222.1
See application file for complete search history.

(56) References Cited

U.S. PATENT DOCUMENTS

| | | | | |
|---|---|---|---|---|
| 5,387,932 A | * | 2/1995 | Morioka | 348/246 |
| 5,532,491 A | | 7/1996 | Hassler et al. | |
| 5,877,808 A | * | 3/1999 | Iizuka | 348/311 |
| 6,392,698 B1 | * | 5/2002 | Yokoyama | 348/222.1 |
| 6,437,824 B1 | * | 8/2002 | Suzuki et al. | 348/222.1 |
| 6,727,957 B1 | * | 4/2004 | Sato | 348/526 |
| 6,885,401 B1 | * | 4/2005 | Nakai et al. | 348/312 |
| 2005/0270390 A1 | | 12/2005 | Hosokai | |

FOREIGN PATENT DOCUMENTS

| | | | |
|---|---|---|---|
| EP | 1659779 A1 | * | 5/2006 |
| JP | 04-180265 | | 6/1992 |
| JP | 2000333037 A | * | 11/2000 |

* cited by examiner

*Primary Examiner* — John Villecco
(74) *Attorney, Agent, or Firm* — McDermott Will & Emery LLP

(57) ABSTRACT

A solid-state image pickup device relating to the present invention comprises a pixel area where multiple pixels used for photoelectric conversion of incident light are two-dimensionally arranged. Vertical signal input lines to which vertical transfer signals for transferring signal charges generated at the pixels vertically in the pixel area are applied are connected to the pixel area. Furthermore, horizontal signal input lines to which horizontal transfer signals for horizontally transferring the signal charges are applied are connected to a horizontal transfer part for horizontally transferring the signal charges transferred vertically in the pixel area. A signal separation part separates vertical and horizontal transfer signals from a pulse signal supplied via a complex signal input terminal and supplies the separated signals to the vertical signal input line and the horizontal signal input line, respectively.

4 Claims, 4 Drawing Sheets

SOLID-STATE IMAGE PICKUP DEVICE HAVING A SIGNAL SEPARATION PART FOR SEPARATING AND PROVIDING VERTICAL AND HORIZONTAL SIGNALS AND DRIVE METHOD THEREOF

CROSS-REFERENCE TO RELATED APPLICATION

The present application claims the benefit of patent application number 2007-307255, filed in Japan on Nov. 28, 2007, the subject matter of which is incorporated herein by reference.

BACKGROUND OF THE INVENTION

1. Field of the Invention

The present invention relates to a solid-state image pickup device applicable to integrated video cameras and digital still cameras and a drive method thereof.

2. Description of the Related Art

Recently, solid-state image pickup devices have been extensively used in the image pickup part of integrated video cameras. Particularly, CCD (charge coupled device) solid-state image pickup devices having excellent noise properties have been extensively used (for example, reference Japanese Laid-Open Patent Application Publication No. H04-180265).

FIG. 3 is a diagrammatic plane view showing a structure of a prior art solid-state image pickup device. As shown in FIG. 3, prior art solid-state image pickup device 100 comprises a pixel area 2 where received light is converted to electric signals through photoelectric conversion. Multiple pixels are two-dimensionally arranged in the pixel area 2. Each pixel has a photodiode generating signal charge according to incident light. Furthermore, multiple a vertical transfer parts (vertical CCDs) for vertically transferring (the up-and-down direction in FIG. 3) signal charges generated at the pixels are provided in the pixel area 2. Here, the vertical transfer parts are of a four-phase drive type wherein first to fourth charge transfer electrodes to which drive signals (vertical transfer signals) different from each other are applied are repeatedly provided.

A horizontal transfer part (horizontal CCD) 3 for horizontally (the transversal direction in FIG. 3) transferring the signal charges transferred vertically in the pixel area 2 by the vertical transfer part is placed in juxtaposition with the pixel area 2. Here, the horizontal transfer part 3 is of a two-phase drive type wherein fifth and sixth charge transfer electrodes to which drive signals (horizontal transfer signals) different from each other are applied are repeatedly provided. The signal charges horizontally transferred by the horizontal transfer part 3 are supplied to an amplifier constituting a signal output part 4 in sequence and output as image signals via an output terminal 5.

A first vertical signal input line 6, a second vertical signal input line 7, a third vertical signal input line 8, and a fourth vertical signal input line 9 are connected to the pixel area 2. The vertical signal input lines 6 to 9 are connected to first to the fourth charge transfer electrodes constituting the vertical transfer part, respectively. A first vertical signal input terminal 10, a second vertical signal input terminal 11, a third vertical signal input terminal 12, and a fourth vertical signal input terminal 13 are connected to the vertical signal input lines 6 to 9, respectively. Vertical transfer signals for transferring signal charges vertically in the pixel area 2 are applied to the first to fourth charge transfer electrodes via the vertical signal input terminals 10 to 13.

Furthermore, a first horizontal signal input line 14 and a second horizontal signal input line 15 are connected to the horizontal transfer part 3. The horizontal signal input lines 14 and 15 are connected to the fifth and sixth charge transfer electrodes constituting the horizontal transfer part 3, respectively. A first horizontal signal input terminal 21 and a second horizontal signal input terminal 22 are connected to the horizontal signal input lines 14 and 15, respectively. Horizontal transfer signals for horizontally transferring the signal charges are applied to the horizontal transfer part 3 via the horizontal signal input terminals 21 and 22. The solid-state image pickup device 100 further comprises a power terminal 24 to which a power supply voltage driving the signal output part 4 is applied, a ground terminal 25 to which a reference potential is applied, and a reset terminal 26.

FIGS. 4A and 4B are timing charts of pulse signals supplied to the vertical signal input terminals 10 to 13 and horizontal signal input terminals 21 and 22 for driving the solid-state image pickup device 100 having the above structure. The timing chart of FIG. 4B is an enlarged view of a part of the timing chart of FIG. 4A (the part enclosed by dash-dot lines) in the time axis direction. FIGS. 4A and 4B show pulse signal waveforms by solid lines. Additional dotted lines are used to clarify the potential levels of pulse waveforms. In FIGS. 4A and 4B, pulse signals V1, V2, V3, and V4 are pulse signals applied to the vertical signal input terminals 10, 11, 12, and 13, respectively, and pulse signals H1 and H2 are pulse signals applied to the horizontal signal input terminals 21 and 22, respectively. The pulse waveforms each have a high level ("Hi" in FIGS. 4A and 4B) and a low level ("Lo" in FIGS. 4A and 4B), which are specific, fixed potential levels. In FIG. 4A, the waveforms of the pulse signals H1 and H2 are shown in a simplified manner for time frames in which the pulse signals alternately have a high level and a low level.

When the solid-state image pickup device 100 is driven according to the timing charts shown in FIGS. 4A and 4B, signal charges generated in the pixel area 2 are vertically transferred upon application of the pulse signals V1, V2, V3, and V4. Then, the signal charges are horizontally transferred upon application of the pulse signals H1 and H2 and image signals are output from the solid-state image pickup device 100 via the signal output part 4 and output terminal 5.

SUMMARY OF THE INVENTION

However, the prior art solid-state image pickup device 100 requires at least four vertical signal input terminals 10 to 13 for vertical transfer and two horizontal signal input terminals 21 and 22 for horizontal transfer as shown in FIG. 3. In addition to these input terminals, the power supply terminal 24, ground terminal 25, output terminal 5, and reset terminal 26 are necessary. Then, a total of at least 10 terminals are necessary.

In semiconductor integrated circuit devices, terminals on the semiconductor chip consist of electrode pads (bonding pads). It is difficult to extremely reduce the electrode pads in size because they are used for wire bonding to make electric connection to the external terminals of a package in which the semiconductor integrated circuit device is sealed. It is also difficult to extremely reduce the distance between electrode pads. For example, the electrode pads have a size of approximately 100 μm×100 μm and their distance is approximately 100 μm. In such a case, if ten electrode pads are arranged in a row, a length of (100 μm+100 μm)×10+100 μm is necessary. Therefore, the solid-state image pickup device 100 shown in FIG. 3 has a length of approximately 2100 μm along a row of electrode pads.

In the above prior art structure, the chip size of a small solid-state image pickup device having a small number of pixels depends on the number of terminals. For example, some medical endoscope is highly required to be small according to a body part to be examined. In order to realize such a compact endoscope, the solid-state image pickup device mounted in the endoscope has to be downsized. However, the prior art structure does not allow the solid-state image pickup device to be downsized because an area for providing ten terminals as described above has to be ensured on the chip.

The present invention is proposed in view of the above circumstances and the purpose of the present invention is to provide a solid-state image pickup device having a reduced number of terminals and a solid-state image pickup device drive method capable of reducing the number of terminals.

In order to resolve the above problem, the present invention uses the following technical means. The solid-state image pickup device relating to the present invention comprises a pixel part where multiple pixels used for photoelectric conversion of incident light are two-dimensionally arranged. Vertical signal input lines to which vertical transfer signals for transferring signal charges generated at the pixels according to incident light vertically in the pixel part are applied are connected to the pixel part. The solid-state image pickup device further comprises a horizontal transfer part for horizontally transferring the signal charges transferred vertically in the pixel part. Horizontal signal input lines to which horizontal transfer signals for horizontally transferring the signal charges are applied are connected to the horizontal transfer part. The solid-state image pickup device further comprises a signal separation part. The signal separation part is connected to the vertical input line, the horizontal signal input line and a complex signal input terminal. The signal separation part separates the vertical and horizontal transfer signals from a complex signal supplied via the complex signal input terminal and supplies the separated signals to the vertical signal input line and horizontal signal input line, respectively.

The solid-state image pickup device uses a common terminal as a vertical transfer signal input terminal and as a horizontal transfer signal input terminal; therefore, the solid-state image pickup device has a reduced number of terminals. In other words, the number of electrode pads formed on the chip of the solid-state image pickup device can be reduced. Consequently, the chip can have a reduced area and an ultracompact solid-state image pickup device can be realized.

For example, the signal separation part can comprise a high clipping circuit and a low clipping circuit. The high clipping circuit clips an upper portion of a complex signal supplied via the complex signal input terminal, wherein the upper portion is equal to or higher than a predetermined potential level in the complex signal, and outputs the clipped signal. The low clipping circuit clips a lower portion of the complex signal supplied via the complex signal input terminal, wherein the lower portion is equal to or lower than the predetermined potential level in the complex signal and outputs the clipped signal. The signal separation part supplies the signal from one of the high and low clipping circuits as the vertical transfer signal and the signal from the other as the horizontal transfer signal.

On the other hand, in another aspect, the present invention provides a method of driving a solid-state image pickup device comprising a pixel part where multiple pixels used for photoelectric conversion of incident light are two-dimensionally arranged, vertical signal input lines connected to the pixel part and to which vertical transfer signals for transferring signal charges generated at the pixels according to the incident light vertically in the pixel area are applied, and horizontal signal input lines to which horizontal transfer signals for horizontally transferring the signal charges transferred vertically in the pixel part are applied. In the method of driving a solid-state image pickup device relating to the present invention, a complex signal consisting of a signal having a predetermined potential level or higher and serving as one of the vertical transfer signal and horizontal transfer signal and a signal having the predetermined potential level or lower and serving as the other is supplied to the solid-state pickup device. On the slid-state image pickup device, the vertical transfer signal and horizontal transfer signal are separated from the supplied complex signal. The separated signals are supplied to the vertical signal input line and the horizontal signal input line, respectively.

The present invention can reduce the number of terminals (number of electrode pads) that is a determination factor of the chip size of a solid-state image pickup device; therefore, the solid-state image pickup device can be downsized. Particularly, small solid-state image pickup devices mounted in endoscopes can significantly be downsized, leading to magnificent efficacy in practice.

The foregoing and other objects, features, aspects and advantages of the present invention will become more apparent from the following detailed description of the present invention when taken in conjunction with the accompanying drawings.

DETAILED DESCRIPTION OF PREFERRED EMBODIMENTS

An embodiment of the present invention will be described in detail hereafter with reference to the drawings. In the embodiment below, the present invention is realized as a CCD-type solid-state image pickup device having vertical transfer parts of a four-phase drive type and a two-phase drive type horizontal transfer part.

Figure 1:
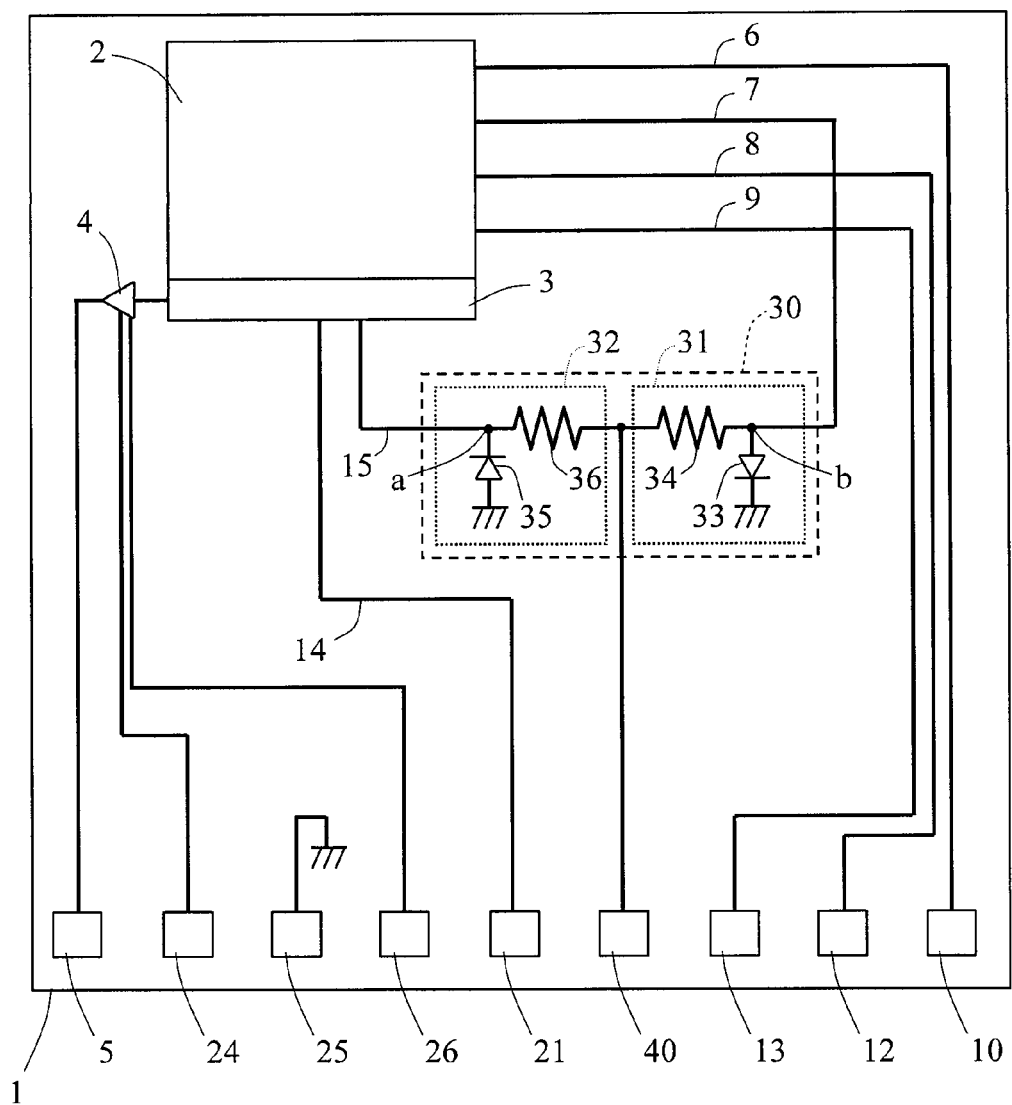
FIG. 1 is a diagrammatic plane view showing a structure of a solid-state image pickup device according to an embodiment of the present invention.

FIG. 1 is a diagrammatic plane view showing the structure of the solid-state image pickup device according to an embodiment of the present invention. As shown in FIG. 1, a solid-state image pickup device 1 of this embodiment comprises a pixel area (pixel part) 2 where received light is converted to electric signals through photoelectric conversion. Multiple pixels are two-dimensionally arranged in the pixel area 2. Each pixel has a photodiode generating signal charge according to incident light. Vertical transfer parts (vertical CCDs) for vertically (the up-and-down direction in FIG. 1) transferring the signal charges generated at the pixels are provided in the pixel area 2. The vertical transfer parts are of a four-phase drive type wherein first to fourth charge transfer electrodes to which drive signals (vertical transfer signals) different from each other are applied are repeatedly provided.

A horizontal transfer part (horizontal CCD) 3 for horizontally (the transverse direction in FIG. 1) transferring the signal charges transferred vertically in the pixel area 2 by the vertical transfer part is placed in juxtaposition with the pixel area 2. The horizontal transfer part 3 is of a two-phase drive type wherein fifth and sixth charge transfer electrodes to which drive signals (horizontal transfer signals) different from each other are applied are repeatedly provided. The signal charges transferred horizontally by the horizontal transfer part 3 are supplied to an amplifier constituting a signal output part 4 in sequence and output as image signals via an output terminal 5.

A first vertical signal input line 6, a second vertical signal input line 7, a third vertical signal input line 8, and a fourth vertical signal input line 9 are connected to the pixel area 2. The vertical signal input lines 6 to 9 are connected to first to fourth charge transfer electrodes constituting the vertical transfer part, respectively. On the other hand, a first horizontal signal input line 14 and a second horizontal signal input 15 are connected to the horizontal transfer part 3. The horizontal signal input lines 14 and 15 are connected to fifth and sixth charge transfer electrodes constituting the horizontal transfer part 3, respectively.

The solid-state image pickup device 1 also comprises a signal separation part 30 and a complex signal input terminal 40 as an input terminal to the signal separation part 30. The signal separation part 30 comprises a high clipping circuit (a first clipping circuit) 31 and a low clipping circuit (a second clipping circuit) 32. The high clipping circuit 31 clips an upper portion of a pulse signal (complex signal) received via the complex signal input terminal 40, wherein the upper portion is equal to or higher than a predetermined potential level in the pulse signal, and outputs the clipped signal. The low clipping circuit 32 clips a lower portion of the pulse signal (complex signal) received via the complex signal input terminal 40, wherein the lower portion is equal to or lower than the predetermined potential level in the pulse signal, and outputs the clipped signal. The output of the high clipping circuit 31 is connected to the second vertical signal input line 7 and the output of the low clipping circuit 32 is connected to the second horizontal signal input line 15.

Like the prior art solid-state image pickup device 100, a first vertical signal input terminal 10, a third vertical signal input terminal 12, and a fourth vertical signal input terminal 13 are connected to the first vertical signal input line 6, third vertical signal input line 8, and fourth vertical signal input line 9, respectively. Furthermore, a first horizontal signal input terminal 21 is connected to the first horizontal signal input line 14. The solid-state image pickup device 1 further comprises a power supply terminal 24 to which a power supply voltage for driving the signal output part 4 is applied, a ground terminal 25 to which a reference potential is applied, and a reset terminal 26 for periodically initializing the signal output part 4.

As shown in FIG. 1, the high clipping circuit 31 of this embodiment consists of a first diode 33 and a first resistor 34. The first resistor 34 is interposed between the input and output of the high clipping circuit 31. The first diode 33 has an anode connected to the output of the first resistor 34 and a cathode connected to the ground (a conductor to which a reference potential is applied by the ground terminal 25) of the solid-state image pickup device 1. Then, the high clipping circuit 31 supplies to the second vertical signal input line 7 a portion of a pulse signal supplied via the complex signal input terminal 40 that has a negative polarity based on the ground potential as a reference potential, namely a pulse signal portion having a reference potential level or lower.

On the other hand, the low clipping circuit 32 consists of a second diode 35 and a second resistor 36. The second diode 36 is interposed between the input and output of the low clipping circuit 32. The second diode 35 has a cathode connected to the output of the second resistor 36 and an anode connected to the ground of the solid-state image pickup device 1. Then, the low clipping circuit 32 supplies to the second horizontal signal input line 15 a portion of a pulse signal supplied via the complex signal input terminal 40 that has a positive polarity based on the ground potential as a reference potential, namely a pulse signal portion having a reference potential level or higher.

In other words, in the solid-state image pickup device 1, the vertical transfer signals for transferring signal charges vertically in the pixel area 2 are applied to the first to fourth charge transfer electrodes constituting the vertical transfer part via the vertical signal input terminals 10, 12, and 13 and complex signal input terminal 40. Furthermore, the horizontal transfer signals for transferring the signal charges horizontally are applied to the fifth and sixth charge transfer electrodes constituting the horizontal transfer part 3 via the horizontal signal input terminal 21 and complex signal input terminal 40.

As understood from FIG. 1, the difference between the solid-state image pickup device 1 of this embodiment and the prior art solid-state image pickup device 100 is that a common terminal (the complex signal input terminal 40) serves as the terminal for supplying a vertical transfer signal to be applied to the second signal input line 7 and as the terminal for supplying a horizontal transfer signal to be applied to the second horizontal signal input line 15 through the intervention of the signal separation part 30.

Figure 2A:
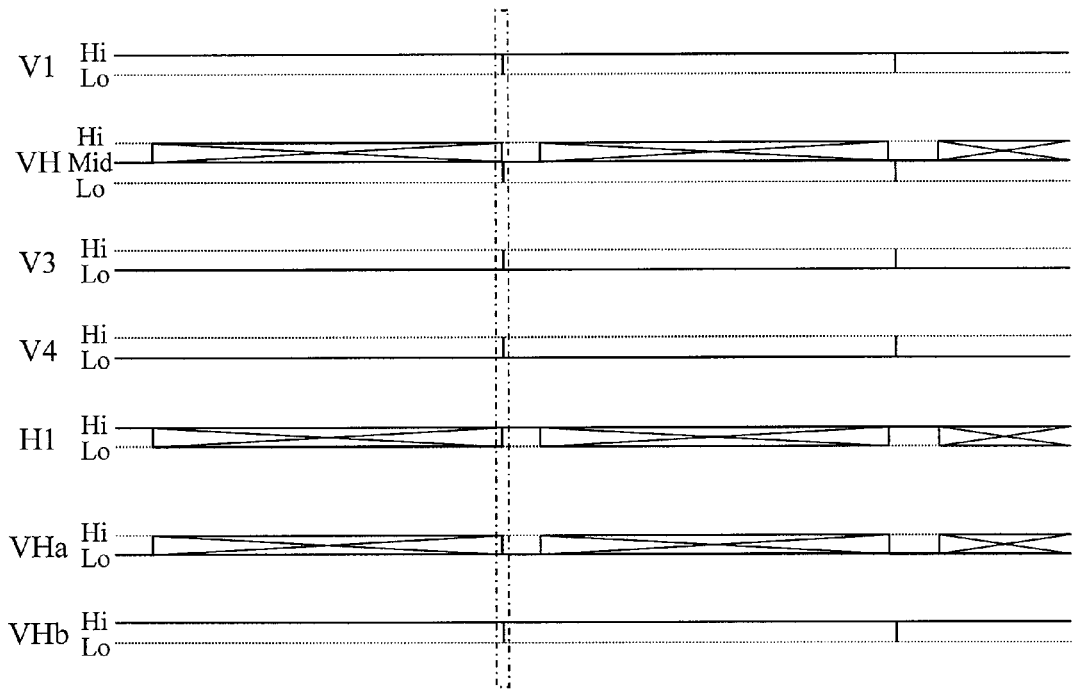
FIGS. 2A and 2B are charts showing drive timing and pulse waveforms applied to terminals of a solid-state image pickup device according to an embodiment of the present invention.
Figure 2B:
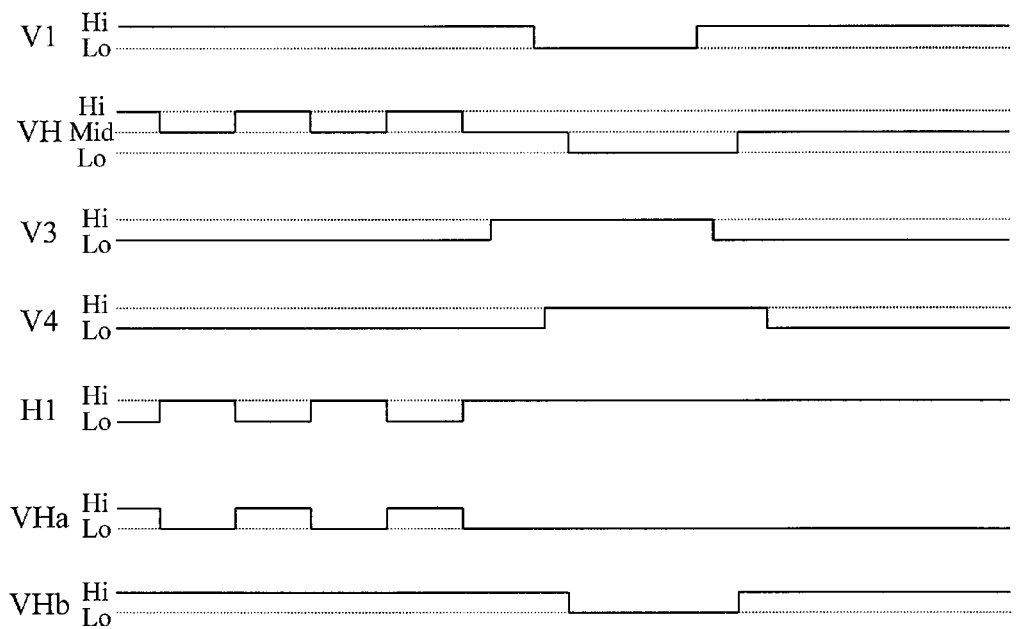
Figure 3:
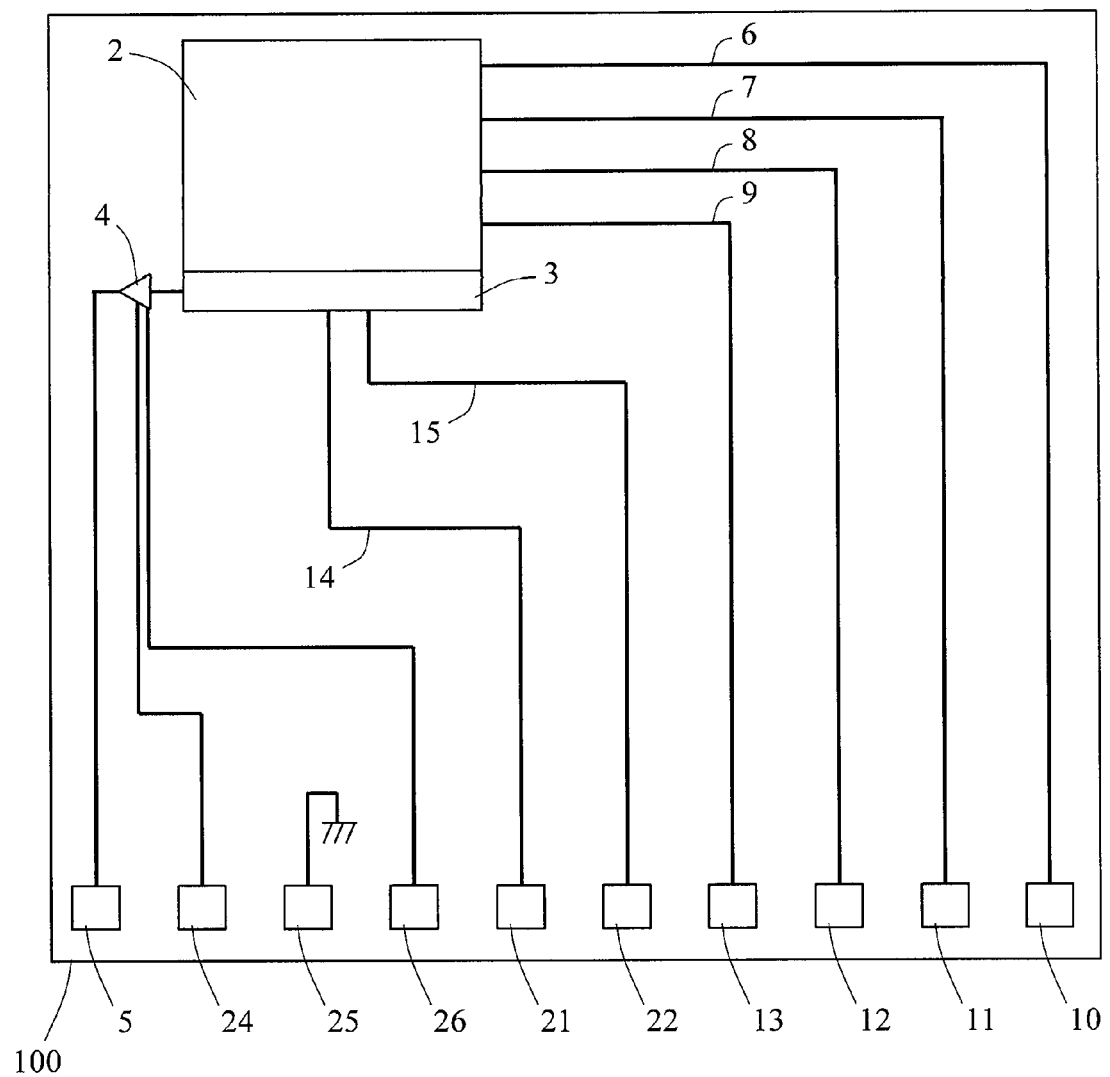
FIG. 3 is a diagrammatic plane view showing a structure of a prior art solid-state image pickup device.

The method of driving the above described solid-state image pickup device 1 will be described hereafter. FIGS. 2A and 2B are timing charts of pulse signals supplied to the vertical signal input terminals 10, 12, and 13, horizontal signal input terminal 21, and complex signal input terminal 40 for driving the solid-state image pickup device 1 shown in FIG. 1. The timing chart of FIG. 2B is an enlarged view of a part of the timing chart of FIG. 2A (the part enclosed by dash-dot lines) in the time axis direction. FIGS. 2A and 2B show the pulse signal waveforms by solid lines. Additional dotted lines are used to clarify the levels of pulse waveforms. In FIGS. 2A and 2B, a pulse signal V1 is a pulse signal applied to the first vertical signal input terminal 10; a pulse signal V3 is a pulse signal applied to the third vertical signal input terminal 12; and a pulse signal V4 is a pulse signal applied to the fourth vertical signal input terminal 13. Furthermore, a pulse signal H1 is a pulse signal applied to the first horizontal signal input terminal 21. Furthermore, a pulse signal VH is a pulse signal applied to the complex signal input terminal 40.

The pulse waveforms V1, V3, V4, H1, and VH each have a high level ("Hi" shown in FIGS. 2A and 2B) and a low level ("Lo" shown in FIGS. 2A and 2B), which are specific, fixed potential levels. The pulse signals typically have the following potential levels: the pulse signals V1, V3, and V4 have a high level (Hi) of 0 volt and a low level (Lo) of minus 6 volts; the pulse signal H1 has a high level (Hi) of 3 volts and a low level (Lo) of 0 volt; and the pulse signal VH has three values, a high level (Hi) of 3 volts, a middle level (Mid) of 0 volt, and a low level (Lo) of minus 6 volts.

In FIG. 2A, the pulse waveform of the pulse signal H1 is shown in a simplified manner for time frames in which the signal alternately has a high level and a low level. The pulse waveform of the pulse signal VH is also shown in a simplified manner for time frames in which the signal alternately has a high level and a middle level.

Driven according to the timing charts shown in FIGS. 2A and 2B, the solid-state image pickup device 1 operates nearly in the same manner as the prior art image pickup device 100.

Figure 4A:
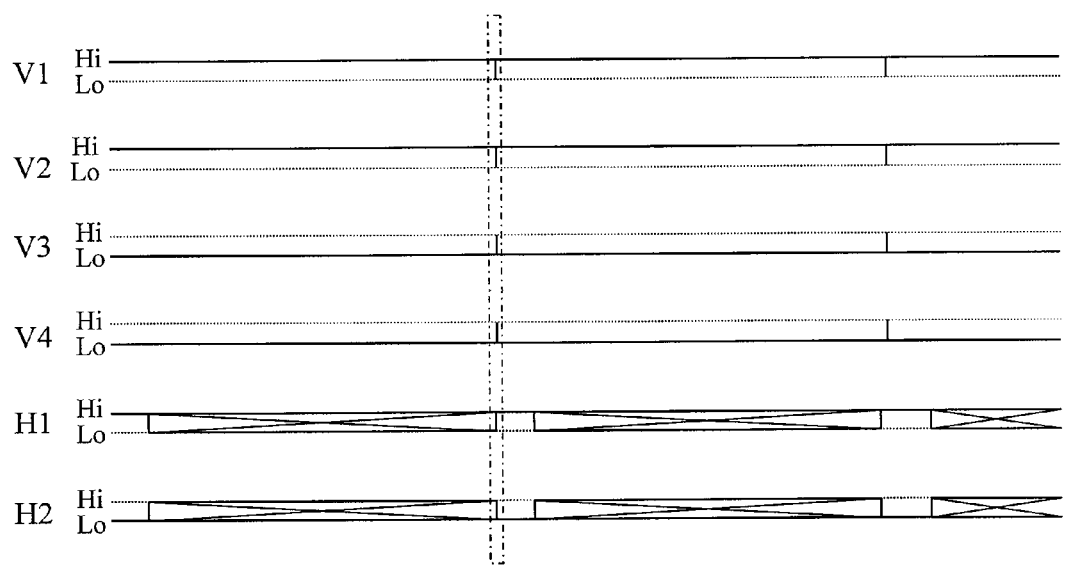
FIG. 4 is charts showing drive timing and pulse waveforms applied to terminals of a prior art solid-state image pickup device.
Figure 4B:
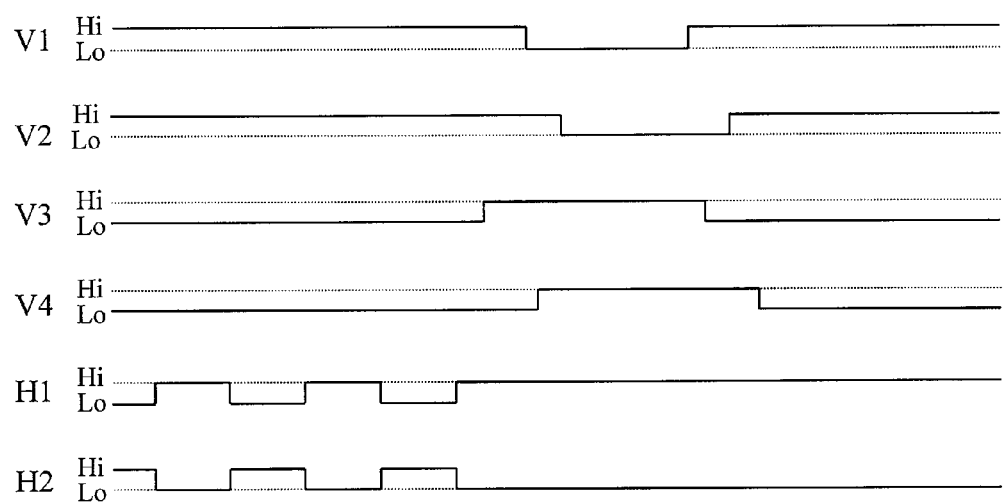

As shown in FIGS. 2A and 2B, the pulse signal VH applied to the complex signal input terminal 40 consists of a signal of a reference potential level (here, the middle level=0 V) or higher corresponding to the pulse signal H2 shown in FIGS. 4A and 4B and a signal of the reference potential level or lower corresponding to the pulse signal V2. The pulse signal VH having the above constituents is applied to the complex signal input terminal 40 and separated by the signal separation part 30. The pulse waveforms VHa and VHb shown in FIGS. 2A and 2B correspond to the waveforms of the pulse signals at the nodes a and b in FIG. 1, respectively.

When the pulse signal VH having the pulse waveform shown in FIGS. 2A and 2B is supplied to the signal separation part 30, a pulse signal having a waveform obtained by clipping a pulse signal portion having a reference potential or lower is output at the node a on the output side of the low clipping circuit 32, the reference potential being a potential level nearly equal to the middle level (0 V) of the pulse signal VH (substantially the middle level). In other words, with the reference potential being a potential level nearly equal to the middle level (0V) of the pulse signal VH, a pulse signal portion having the reference potential or higher is applied to the second horizontal signal input line 15. This pulse signal portion has the same waveform as the horizontal transfer signal H2 applied to the second horizontal signal input line 15 in the prior art (See FIGS. 4A and 4B).

On the other hand, when the pulse signal VH having the pulse waveform shown in FIGS. 2A and 2B is supplied to the signal separation part 30, a pulse signal having a pulse waveform obtained by clipping a pulse signal portion having a reference potential or higher is output at the node b on the output side of the high clipping circuit 31, the reference potential being a potential level nearly equal to the middle level (0 V) of the pulse signal VH (substantially the middle level). In other words, with the reference potential being a potential level nearly equal to the middle level (0V) of the pulse signal VH, a pulse signal portion having a reference potential or lower is applied to the second vertical signal input line 7. This pulse signal portion has the same waveform as the vertical transfer signal V2 applied to the second vertical signal input line 7 in the prior art (See FIGS. 4A and 4B).

Hence, when the solid-state image pickup device 1 is driven according to the timing charts shown in FIGS. 2A and 2B, the pulse signals V1, VHb, V3, and V4 are applied to the first to fourth charge transfer electrodes of the vertical transfer part, respectively. Consequently, signal charges generated in the pixel area 2 are vertically transferred as in the prior art solid-state image pickup device 100. Then, the pulse signals H1 and VHa are applied to the fifth and sixth charge transfer electrodes of the horizontal transfer part 3. Consequently, the signal charges transferred vertically in the pixel area 2 are horizontally transferred as in the prior art solid-state image pickup device 100, and image signals are output from the solid-state image pickup device 1 via the signal output part 4 and output terminal 5.

As described above, this embodiment allows horizontal and vertical transfer signals to be supplied to the second horizontal signal input line 15 and second vertical signal input line 7, respectively, independently simply by providing a pulse signal through one input terminal or the complex signal input terminal 40. Therefore, the number of input terminals can be reduced compared with the prior art. Consequently, the area occupied by the terminals on a chip can be reduced and the chip area can be reduced to produce a small solid-state image pickup device. According to this embodiment, for example, a small solid-state image pickup device having terminals (bonding pads) of 100 μm×100 μm in size and a relatively small number of pixels for example for medical use can be reduced by approximately 20% in chip area.

In the above description, the pulse signals V2 and H2 shown in FIGS. 4A and 4B are used to constitute a single pulse signal and this pulse signal is supplied via the complex signal input terminal 40. This is because the pulse signals V2 and H2 are easy to combine.

The pulse signal V2 has a high level (0 V) and the pulse signal H2 has a low level (0 V) in time frames in which no signal charge transfer occurs as shown in FIGS. 4A and 4B. On the other hand, the pulse signal V2 presents a waveform with a low level (−6 V) and the pulse signal H2 presents a waveform with a high level (3 V) in time frames in which signal charge transfer occurs. In other words, both the pulse signal V2 and the pulse signal H2 have zero volt in time frames in which no signal charge transfer occurs and they have pulse waveforms with opposite polarities in time frames in which signal charge transfer occurs. These two pulse signals do not overlap in time frames in which signal charge transfer occurs. Therefore, the pulse signals V2 and H2 can simply be supplied via the complex signal input terminal 40 to constitute the pulse signal VH without passing through any special circuit. In this point, the pulse signals V1 and H2 can be supplied to the complex signal input terminal and separated by the signal separation part so that the corresponding pulse signals are supplied to the first vertical signal input line 6 and second horizontal signal input line 15, respectively.

The vertical and horizontal transfer signals to be combined so as to constitute the complex signal is not restricted to those to be easily combined. Any combination separable on the solid-state image pickup device can be used. For example, when the complex signal consists of vertical and horizontal transfer signals of which either one has a predetermined potential level or higher and the other has the predetermined potential level or lower, the vertical or horizontal transfer signal can be converted by a level shifting circuit to a pulse signal having a desired potential level on the solid-state image pickup device after the complex signal is separated by the signal separation part.

In the above embodiment, a solid-state image pickup device having vertical transfer parts of a four-phase drive-type was described. The same efficacy can be obtained using a vertical transfer part with a different number of charge transfer electrodes. For example, in order to drive a solid-state image pickup device having vertical transfer parts of a three-phase drive type, the prior art structure requires nine terminals, namely three vertical signal input terminals, two horizontal signal input terminals, a power supply terminal, a ground terminal, an output terminal, and a reset terminal. Conversely, with the above technique to use a common terminal as a vertical signal input terminal and a horizontal signal input terminal, eight terminals, namely two vertical signal input terminals, a horizontal signal input terminals, a complex signal input terminal, a power supply terminal, a ground terminal, an output terminal, and a reset terminal, are required to drive a solid-state image pickup device.

As described above, the present invention can reduce the number of terminals (electrodes pads), which is a determination factor of the chip size of a solid-state image pickup device, and the solid-state image pickup device can be downsized. Particularly, a small solid-state image pickup device with a pixel part having a small number of pixels can significantly be downsized.

The above described embodiment does not restrict the technical scope of the present invention in any way. Various modifications and applications are available within the scope of the present invention besides what is described above. For example, the present invention is not restricted to an interline type solid-state image pickup device as described above and applicable to a frame transfer type (FT type) solid-state image pickup device.

The present invention particularly allows a small solid-state image pickup device having a relatively small number of pixels to be significantly downsized and provides a useful solid-state image pickup device and drive method thereof.

What is claimed is:

1. A solid-state image pickup device, comprising:
    a pixel part where multiple pixels used for photoelectric conversion of incident light are two-dimensionally arranged;
    vertical signal input lines connected to the pixel part and to which vertical transfer signals for transferring signal charges generated at the pixels according to the incident light vertically in the pixel part are applied;
    a horizontal transfer part for horizontally transferring the signal charges transferred vertically in the pixel part;
    horizontal signal input lines connected to the horizontal transfer part and to which horizontal transfer signals for horizontally transferring the signal charges are applied; and
    a signal separation part, connected to at least one of the vertical signal input lines, at least one of the horizontal signal input lines and a complex signal input terminal, for separating a vertical transfer signal and a horizontal transfer signal from a complex signal supplied via the complex signal input terminal, and for supplying the separated signals to the at least one of the vertical signal input lines and the at least one of the horizontal signal input lines, respectively,
    wherein the complex signal has at least three different voltage values.

2. The solid-state image pickup device according to claim 1, wherein:
    the signal separation part comprises:
        a first clipping circuit clipping an upper portion of a complex signal supplied via the complex signal input terminal, the upper portion being equal to or higher than a predetermined potential level, and outputting the clipped signal; and
        a second clipping circuit clipping a lower portion of the complex signal supplied via the complex signal input terminal, the lower portion being equal to or lower the predetermined potential level, and outputting the clipped signal, and
    the signal separation part supplies a signal output from one of the first and second clipping circuits as one of the vertical transfer signals and a signal from the other as one of the horizontal transfer signals.

3. A solid-state image pickup device, comprising:
    a pixel part where multiple pixels used for photoelectric conversion of incident light are two-dimensionally arranged;
    vertical signal input lines connected to the pixel part and to which vertical transfer signals for transferring signal charges generated at the pixels according to the incident light vertically in the pixel part are applied;
    a horizontal transfer part for horizontally transferring the signal charges transferred vertically in the pixel part;
    horizontal signal input lines connected to the horizontal transfer part and to which horizontal transfer signals for horizontally transferring the signal charges are applied; and
    a signal separation part, connected to at least one of the vertical signal input lines, at least one of the horizontal signal input lines and a complex signal input terminal, for separating a vertical transfer signal and a horizontal transfer signal from a complex signal supplied via the complex signal input terminal, and for supplying the separated signals to the at least one of the vertical signal input lines and the at least one of the horizontal signal input lines, respectively, wherein:
    the signal separation part comprises:
        a first clipping circuit clipping an upper portion of a complex signal supplied via the complex signal input terminal, the upper portion being equal to or higher than a predetermined potential level, and outputting the clipped signal; and
        a second clipping circuit clipping a lower portion of the complex signal supplied via the complex signal input terminal, the lower portion being equal to or lower the predetermined potential level, and outputting the clipped signal, and
    the signal separation part supplies a signal output from one of the first and second clipping circuits as one of the vertical transfer signals and a signal from the other as one of the horizontal transfer signals.

4. A method of driving a solid-state image pickup device comprising a pixel part where multiple pixels used for photoelectric conversion of incident light are two-dimensionally arranged; vertical signal input lines connected to the pixel part and to which vertical transfer signals for transferring signal charges generated at the pixels according to the incident light vertically in the pixel part are applied; and horizontal signal input lines to which horizontal transfer signals for horizontally transferring the signal charges transferred vertically in the pixel part are applied, the method comprising the steps of:
    supplying to the solid-state image pickup device a complex signal consisting of a signal having a predetermined potential level or higher and serving as one of the vertical transfer signals or one of the horizontal transfer signals and a signal having the predetermined potential level or lower and serving as the other; and
    separating one of the vertical transfer signals and one of the horizontal transfer signals from the supplied complex signal on the solid-state image pickup device and supplying the separated signals to one of the vertical signal input lines and one of the horizontal signal input lines, respectively.

* * * * *